Nov. 2, 1943.  J. R. JACKSON, SR  2,333,425
ARTIFICIAL BAIT
Original Filed June 3, 1941

Inventor
John Robert Jackson, Sr.
By Clarence A. O'Brien
Attorney

UNITED STATES PATENT OFFICE 2,333,425

ARTIFICIAL BAIT

John Robert Jackson, Sr., Kakabeka Falls, Ontario, Canada

Substituted for abandoned application Serial No. 396,468, June 3, 1941. This application May 31, 1943, Serial No. 489,218

2 Claims. (Cl. 43—46)

My invention relates to improvements in artificial bait for use in trolling for game fish or in casting, the same being a substitute for my application Serial No. 396,468, filed June 3, 1941, and which was allowed on October 6, 1941.

The principal object in view is to provide a device of this character having the form of a minnow equipped to simulate when drawn through the water, the action of swimming and other antics of a fish.

Another object is to provide a device of the character and for purpose above set forth which is practically indestructible and may be manufactured at a very low cost.

To the accomplishment of the above, and subordinate objects presently appearing, the preferred embodiment of my invention has been illustrated in the accompanying drawing, set forth in detail in the succeeding description, and defined in the claims appended hereto.

Figure 1:
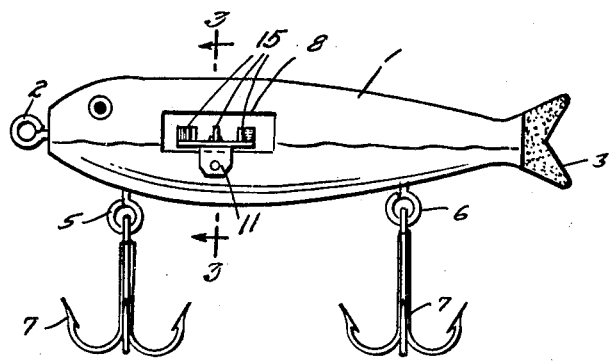
Figure 1 is a view in side elevation of a preferred embodiment of my invention.
Figure 2:
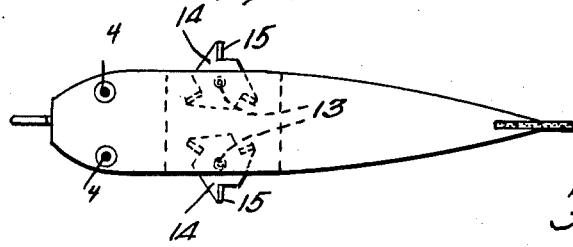
Figure 2 is a view in top plan.
Figure 4:
Figure 4 is a view in perspective of one of the paddle wheels.
Figure 3:
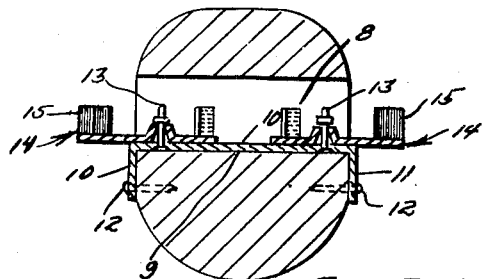
Figure 3 is a view in transverse section taken on a line 3—3 of Figure 1 and drawn to an enlarged scale.

Reference being had to the drawing by numerals, my improved artificial bait comprises a body 1 of any suitable inexpensive material adapted to float on the surface of the water and having the form of the usual minnow. At the nose end of the body 1 is an eye screw 2 for attachment of a line thereto. The body is provided with a rubber tail 3 which by virtue of its resiliency and other well known characteristics is not easily bitten off by a fish striking at the same.

At appropriate points eyes 4 are provided on the body in any suitable manner.

A pair of eye screws 5, 6 are provided in the belly of the body to depend therefrom adjacent the nose and tail ends of said body, respectively, and from which the usual cluster hooks 7 are adapted to depend, said hooks being swiveled in said eye screws in the usual manner.

At an appropriate point, corresponding to the location of the usual gills, a rectangular slot 8 is provided in the body 1 to extend transversely therethrough from side to side thereof, said slot having a flat bottom 9 arranged at an appropriate level on the body to be partially submerged when the bait is drawn along the surface of the water.

A flat bearing plate 10, preferably of tin, is provided on the bottom 9 of the slot 8 to extend from side to side of the body 1 and which is secured to the latter by a pair of attaching ears 11 depending from said plate at opposite sides of the body 1 and secured thereto as by nails 12. A pair of upstanding rivets 13 are suitably anchored in the plate 10 adjacent opposite sides of the body 1, respectively, which serve as bearing studs for a pair of paddle wheels 14 which thereby are mounted to rotate about upstanding axes when the body is drawn through or over the surface of the water. The paddle wheels 14 rotate flat against the plate 10 and are provided with any desired number of upstanding blades 15 arranged to assume upstanding position when the body 1 is drawn through the water to cause the paddle wheels to rotate about the rivets 13 under the action of the water against said blades.

A particular feature of my invention is that the blades 15 are arranged on the paddle wheels 14 so that they extend one at a time beyond the sides of the body 1, and said blades are provided with a silvered, or like colored, front side and a red rear side whereby from either the nose end of the body 1 or the tail end thereof, said wheels during rotation thereof simulate the action of the usual fish gills sufficiently to impart a realistic appearance to the bait, and also the action of swimming.

The operation, and advantages of my invention will, it is believed, be readily understood from the foregoing without further explanation.

Manifestly the invention, as described, is susceptible of modification without departing from the inventive concept, and right is herein reserved to such modifications as fall within the scope of the subjoined claims.

Having described the invention, what is claimed as new is:

1. An artificial minnow comprising a body adapted to be drawn through the water, and means on said body operative under the action of the water thereagainst to simulate the action of gills comprising a pair of paddle wheels mounted in said body to extend outwardly from the sides thereof, said wheels including blades rotatably in upstanding position about vertical axes and differently colored upon opposite sides thereof in accordance with the coloring of fish gills viewed from the front and rear thereof, respectively.

2. An artificial minnow comprising a body adapted to be drawn through the water, means on said body operative under the action of the water thereagainst to simulate the action of gills comprising a pair of paddle wheels mounted in said body to extend outwardly from the sides thereof, said wheels including blades rotatable in upstanding position about vertical axes and differently colored upon opposite sides thereof in accordance with the coloring of fish gills viewed from the front thereof, respectively, said body having a transverse slot extending therethrough and said wheels being mounted in said slot to extend part way out of the same, and a bearing plate for said wheels disposed on the bottom of the slot.

JOHN ROBERT JACKSON, Sr.